United States Patent
Oveyssi

(10) Patent No.: US 6,906,897 B1
(45) Date of Patent: Jun. 14, 2005

(54) DISK DRIVE INCLUDING AN ACTUATOR MAIN COIL AND AN ACTUATOR SECONDARY COIL WITH A LATERAL SEGMENT AND METHOD OF OPERATING SAME

(75) Inventor: Kamran Oveyssi, San Jose, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 183 days.

(21) Appl. No.: 10/377,210

(22) Filed: Feb. 28, 2003

(51) Int. Cl.[7] .............................. G11B 21/08; G11B 5/55
(52) U.S. Cl. ..................................................... 360/265
(58) Field of Search ............................. 360/265, 264.9, 360/264.7, 264.3, 264.1, 264, 260, 240; D14/348, 363

(56) References Cited

U.S. PATENT DOCUMENTS

| | | | |
|---|---|---|---|
| 5,295,031 A | 3/1994 | Wasson | 360/264.9 |
| 5,523,911 A | 6/1996 | Mita et al. | 360/264.7 |
| 5,764,441 A | 6/1998 | Aruga et al. | 360/265 |
| 6,104,581 A | 8/2000 | Huang et al. | 360/264.7 |
| 6,768,614 B2 * | 7/2004 | Chang et al. | 360/264.7 |
| 2002/0054457 A1 * | 5/2002 | Koganezawa | 360/264.3 |
| 2002/0097527 A1 * | 7/2002 | Chang | 360/264.7 |

* cited by examiner

*Primary Examiner*—Julie Anne Watko
(74) *Attorney, Agent, or Firm*—Won Tae C. Kim, Esq.; Stetina, Brunda, Garred & Brucker

(57) ABSTRACT

A disk drive includes a magnetic element having first and second magnets extending radially with respect to an axis of rotation of an actuator. The disk drive further includes a main coil. The main coil includes first and second radial segments. The first radial segment overlaps the first magnet throughout a full range of motion of the actuator. The second radial segment overlaps the second magnet throughout the full range of motion of the actuator. The disk drive further includes a secondary coil which is separately energized from the main coil. The secondary coil is configured to produce magnetic forces upon the actuator substantially parallel to the actuator longitudinal axis. The secondary coil includes a lateral segment disposed perpendicular to the actuator longitudinal axis and overlapping the first and second magnets throughout the full range of motion of the actuator.

12 Claims, 3 Drawing Sheets

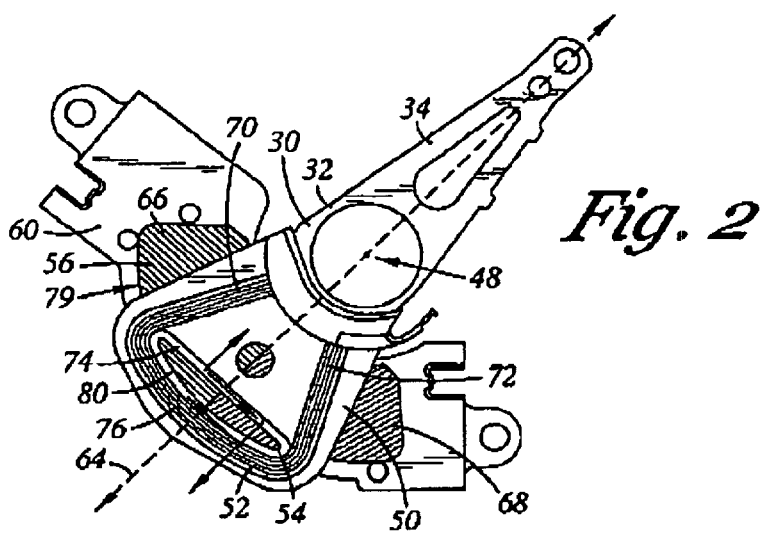
Fig. 2
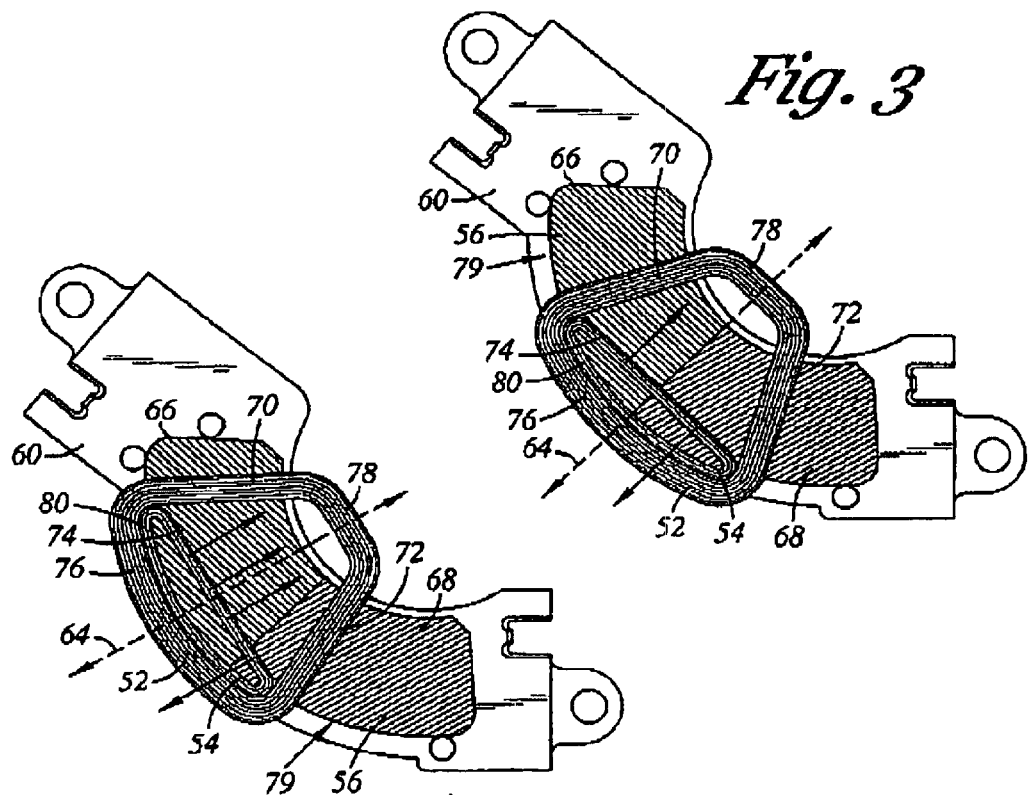
Fig. 3
Fig. 4

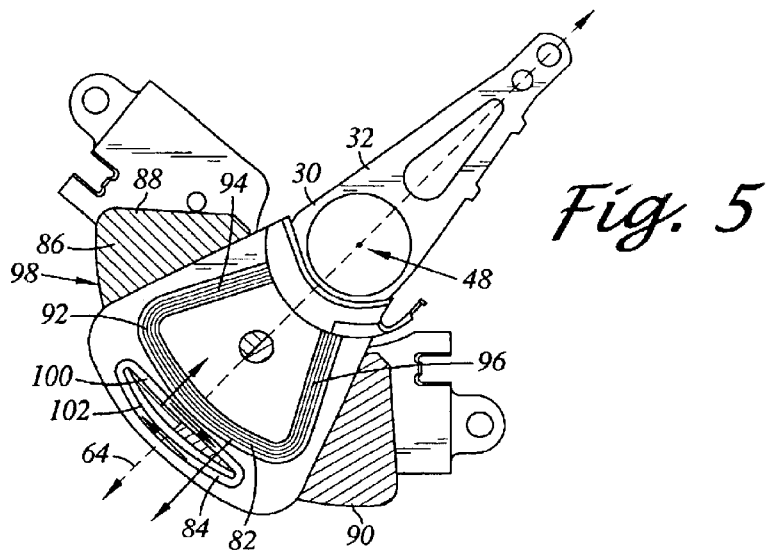
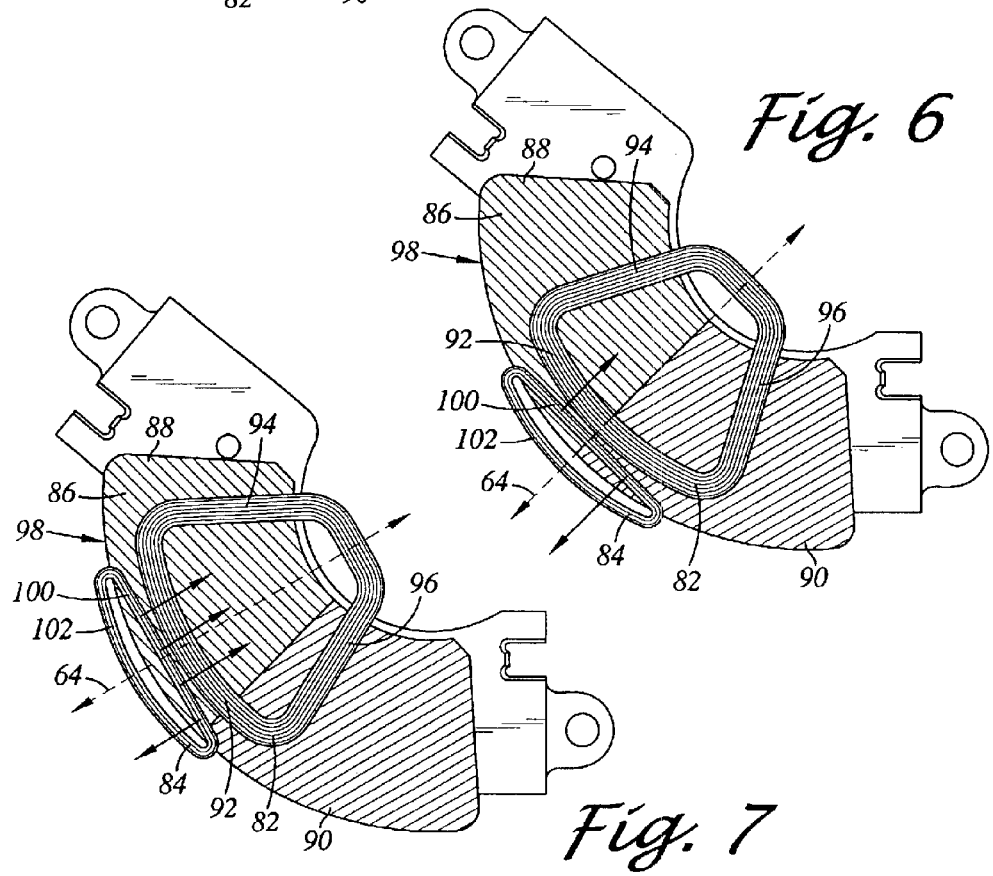

DISK DRIVE INCLUDING AN ACTUATOR MAIN COIL AND AN ACTUATOR SECONDARY COIL WITH A LATERAL SEGMENT AND METHOD OF OPERATING SAME

CROSS-REFERENCE TO RELATED APPLICATIONS

Not applicable.

FIELD OF THE INVENTION

The present invention relates generally to disk drives, and in particular to a disk drive including an actuator main coil and an actuator secondary coil with a lateral segment and a method of operating the same.

DESCRIPTION OF THE PRIOR ART

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head sack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body. A head gimbal assembly includes a transducer head, typically a magneto-resistive ("MR") head, which is distally attached to each of the actuator arms. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

The actuator assembly has various natural modes of vibration. One such mode is referred to as a "butterfly" mode or the first principal bending mode. During such a butterfly mode, the actuator arms and the coil support slightly flex or bend toward and away from each other in a plane orthogonal to the axis of rotation and the heads move away from its position on the disk. This is due to those electro-magnetic forces in a direction perpendicular to a longitudinal axis of the actuator produced by the current through the coil and the electro-magnetic forces interaction with the magnetic field of the magnets. Thus, if the natural frequency of the butterfly mode is 5 kilo hertz and the applied current into the coil has a 5 kilo hertz component, then this will result in the potential for undesirable excitation of the butterfly mode. While a filter, such as a notch filter, may be used to remove the frequency component corresponding to the natural frequency of the butterfly mode, that may negatively impact the capability of the actuator servo control system by reducing its bandwidth. Accordingly, there is a need in the art for a disk drive having an improved actuator coil and magnet design in comparison to the prior art.

SUMMARY OF THE INVENTION

An aspect of the present invention can be regarded as a disk drive including a disk drive base. The disk drive further includes an actuator rotatably coupled to the disk drive base and defining an actuator longitudinal axis orthogonal to the axis of rotation. The actuator includes an actuator body configured to pivot about an axis of rotation and a coil support extending from the actuator body. The disk drive further includes a magnetic element coupled to the disk drive base. The magnetic element includes first and second magnets extending radially with respect to the axis of rotation. The disk drive further includes a main coil attached to the coil support. The main coil includes first and second radial segments. The first radial segment overlaps the first magnet throughout a full range of motion of the actuator. The second radial segment overlaps the second magnet throughout the full range of motion of the actuator. The disk drive further includes a secondary coil attached to the coil support. The secondary coil is separately energized from the main coil. The secondary coil is configured to produce magnetic forces upon the actuator substantially parallel to the actuator longitudinal axis. The secondary coil includes a lateral segment disposed perpendicular to the actuator longitudinal axis and overlapping the first and second magnets throughout the full range of motion of the actuator.

According to various embodiments, the main coil may include a main coil outer transition segment electrically connecting the first and second radial segments. The magnetic element defines a magnet periphery and the main coil outer transition segment may be disposed overlapping the magnetic element beyond the magnet periphery. In one embodiment, the secondary coil is disposed within the main coil. The secondary coil may include a secondary coil outer transition segment electrically connected to the lateral segment. The secondary coil outer transition segment may be disposed overlapping the magnetic element beyond the magnet periphery. In another embodiment, the main coil may include a main coil outer transition segment electrically connecting the first and second radial segments. The magnetic element defines a magnet periphery and the main coil outer transition segment is disposed overlapping the magnetic element within the magnet periphery. The main coil outer transition segment may be arc-shaped and defined by a radius from the axis of rotation. The lateral segment may be disposed radially further than the main coil with respect to the axis of rotation. According to an embodiment, only a selected one of the main coil and the secondary coil is energizable at any given time. The main coil is configured to be energized during track seeking operations, and the secondary coil is configured to be energized during track follow operations. The main coil is configured to be not energized during track follow operations.

According to another aspect of the invention, there is provided a method of operating a disk drive. The disk drive includes an actuator defining an actuator longitudinal axis orthogonal to an axis of rotation. The disk drive further includes a magnetic element including first and second magnets extending radially with respect to the axis of rotation. The disk drive further includes a main coil. The method includes energizing a main coil during track seek operations of the disk drive. The main coil includes first and second radial segments. The first radial segment overlaps the first magnet throughout a full range of motion of the actuator. The second radial segment overlaps the second magnet throughout a full range of motion of the actuator. The method further includes energizing a secondary coil during track follow operations of the disk drive. The secondary coil is separately energized from the main coil. The secondary coil is configured to produce magnetic forces upon the actuator substantially parallel to the actuator longitudinal axis. The secondary coil includes a lateral segment disposed perpendicular to the actuator longitudinal axis and overlapping the first and second magnets throughout the full range of motion of the actuator. The main coil may be configured to be not energized during track follow operations.

BRIEF DESCRIPTION OF THE DRAWINGS

FIG. 2 is an enlarged plan view of a portion of the actuator as shown generally assembled in relation to a magnetic element of FIG. 1 with symbolic lines indicative of current through the secondary coil and force lines indicating electromagnetic forces associated therewith;

FIG. 3 is an enlarged view of the magnetic element and main and secondary coils of FIG. 2 (without an actuator body shown) corresponding to the actuator being angularly centered with respect to the magnetic element;

FIG. 4 is a view similar to the magnetic element and main and secondary coils of FIG. 3, however, with the main and secondary coils corresponding to the actuator being in a rotated position;

FIG. 5 is a view similar to FIG. 3, however with an actuator of another embodiment with a secondary coil disposed radially further than a main coil;

FIG. 6 is an enlarged view of the magnetic element and main and secondary coils of FIG. 5 (without an actuator body shown) corresponding to the actuator being angularly centered with respect to the magnetic element; and FIG. 7 is a view similar to the magnetic element and main and secondary coils of FIG. 6, however, with the main and secondary coils corresponding to the actuator being in a rotated position.

DESCRIPTION OF THE PREFERRED EMBODIMENTS

Figure 1:
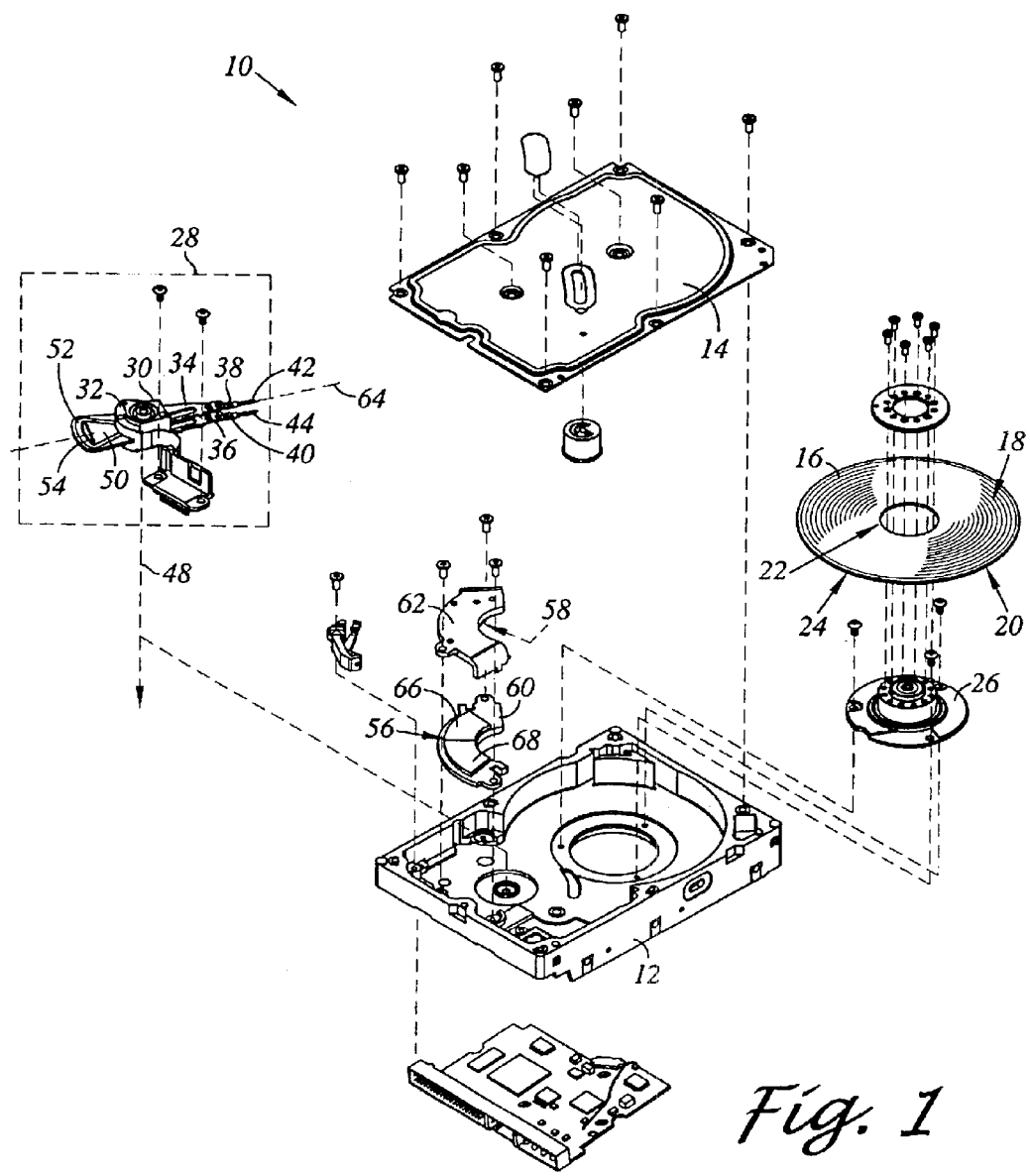
FIG. 1 is an exploded perspective view of a disk drive including an actuator with a coil support supporting a main coil and a secondary coil as constructed in accordance with the present invention.

Referring now to the drawings wherein the showings are for purposes of illustrating preferred embodiments of the present invention only, and not for purposes of limiting the same, FIGS. 1–7 illustrate a disk drive in accordance with the aspects of the present invention.

Referring now to FIG. 1, there is depicted an exploded perspective view of a disk drive 10 as constructed in accordance with an aspect of the present invention. The disk drive 10 includes a head disk assembly (HDA) and a printed circuit board assembly (PCBA). The head disk assembly includes a disk drive base 12 and a cover 14 that collectively house at least one magnetic disk 16. The disk 16 contains a plurality of tracks for storing data. The tracks are disposed upon opposing first and second disk surfaces 18, 20 of the disk 16 that extend between an inner disk edge 22 (associated with the inner diameter) and an outer disk edge 24 (associated with the outer diameter) of the disk 16. The head disk assembly further includes a spindle motor 26 for rotating the disk 16. The head disk assembly further includes a head stack assembly 28 rotatably attached to the disk drive base 12 in operable communication with the disk 16. The head stack assembly 28 includes a rotatable actuator 30. In the embodiment shown, the actuator 30 includes an actuator body 32 and first and second actuator arms 34, 36 that extend from the actuator body 32. Distally attached to the first and second actuator arms 34, 36 are first and second suspensions 38, 40. The first and second suspensions 38, 40 respectively support transducer heads 42, 44. It is contemplated that the number of actuator arms may vary depending upon the number of disks and disk surfaces utilized.

The actuator body 32 includes a bore, and the actuator 30 further includes a pivot bearing cartridge 46 engaged within the bore for facilitating the actuator body 32 to rotate between limited positions about an axis of rotation 48. The actuator 30 further includes a coil support 50 that extends from one side of the actuator body 32 opposite the first and second actuator arms 34, 36. In this embodiment, the coil support 50 is configured to support a main coil 52 and a secondary coil 54. A pair of magnetic elements 56, 58 is supported to mounts 60, 62 which are attached to the disk drive base 16 (magnetic element 58 is indicated by the dashed lead line and it is understood the magnetic element 58 is disposed underneath the mount 62). The magnetic elements 56, 58 may be attached to the disk drive base 12 through other arrangements, such as the magnetic element 58 being directly mounted to the cover 12 which is mechanically engaged with the disk drive base 12. The main and secondary coils 52, 54 interact with the magnetic elements 56, 58 to form a voice coil motor for controllably rotating the actuator 30.

Referring additionally to FIG. 2, there is depicted an enlarged plan view of the actuator 30 as shown generally assembled in relation to the magnetic element 56 and the actuator 30 of FIG. 1. As will be discussed further below, the secondary coil 54 in shown to include symbolic lines indicative of current through the secondary coil 54 and force lines indicating electromagnetic forces associated therewith due to interaction with the magnetic element 56. FIG. 3 is an enlarged plan view of a portion of FIG. 2 depicting the main and secondary coils 52, 54 in relation to the magnetic element 56. For case of discussion, in this figure the remaining portions of the actuator 30 are not depicted, such as the actuator body 32 and the coil support 50.

An aspect of the present invention can be regarded as the disk drive 10 including the disk drive base 12. The disk drive 10 further includes the actuator 30 rotatably coupled to the disk drive base 12. The actuator 30 defines an actuator longitudinal axis 64 which is disposed orthogonal to the axis of rotation 48. The actuator 30 includes the actuator body 32 configured to pivot about an axis of rotation 48. The actuator 30 further includes the coil support 50 which extends from the actuator body 32. The disk drive 10 further includes a magnetic element, such as magnetic element 56 of the magnetic elements 56, 58. The magnetic element 56 is coupled to the disk drive base 12. The magnetic element 56 includes first and second magnets 66, 68 extending radially with respect to the axis of rotation 48. The disk drive 10 further includes the main coil 52 attached to the coil support 50. The main coil 52 includes first and second radial segments 70, 72. The first radial segment 70 overlaps the first magnet 66 throughout a full range of motion of the actuator 30. The second radial segment 72 overlaps the second magnet 68 throughout the full range of motion of the actuator 30. The disk drive 10 further includes the secondary coil 54 attached to the coil support 50. The secondary coil 54 is separately energized from the main coil 52. The secondary coil 54 is configured to produce magnetic forces upon the actuator 30 substantially parallel to the actuator longitudinal axis 64. The secondary coil 54 includes a lateral segment 74 disposed perpendicular to the actuator longitudinal axis 64 and overlapping the first and second magnets 66, 68 throughout the full range of motion of the actuator 30.

According to various embodiments, the main coil 52 may include a main coil outer transition segment 76 electrically connecting the first and second radial segments 70, 72. As seen in FIG. 3, the main coil 52 may further include a main coil inner transition segment 78 electrically connecting the first and second radial segments 70, 72. It is contemplated that the main coil outer transition segment 76 blends or is otherwise integrated with the first and second radial segments 70, 72. Similarly the main coil inner transition segment 78 blends or is otherwise integrated with the first and second radial segments 70, 72. The main coil 52 may be formed of various shapes such a generally trapezoidal as shown. It is contemplated that the first and second radial segments 70, 72 are generally straight segments which radially extend in a direction from the axis of rotation 48.

The magnetic element 56 defines a magnet periphery 79. In the embodiment shown, the main coil outer transition segment 76 is disposed overlapping the magnetic element 56 beyond the magnet periphery 79, such as seen for example in the plan views of FIGS. 2 and 3. Further shown in this embodiment, the secondary coil 54 is disposed within the main coil 52. The secondary coil 54 may include a secondary coil outer transition segment 80 electrically connected to the lateral segment 74. It is contemplated that the secondary coil outer transition segment 80 blends or is otherwise integrated with the lateral segment 74. The secondary con outer transition segment 80 may be disposed overlapping the magnetic element 56 beyond the magnet periphery 79.

As mentioned above, the first and second radial segments 70, 72 respectively overlap the first magnet 66 and the second magnet 68 throughout a full range of motion of the actuator 30. As used herein being disposed overlapping refers to being aligned when overlaid in a plane orthogonal to the axis of rotation 48 such as viewed in FIGS. 2 and 3. Similarly, the lateral segment 74 being disposed overlapping the first and second magnets 66, 68 throughout the full range of motion of the actuator 30 refers to the lateral segment 74 and the first and second magnets 66, 68 being aligned when overlaid in a plane orthogonal to the axis of rotation 48 such as viewed in FIGS. 2 and 3. As further mentioned above, the main coil outer transition segment 76 is disposed overlapping the magnetic element 56 beyond the magnet periphery 79. Such overlapping beyond the magnet periphery 79 refers to main coil outer transition segment 76 generally not being aligned with the magnetic element 56 when overlaid in a plane orthogonal to the axis of rotation 48 such as viewed in FIGS. 2 and 3. Likewise, the secondary coil outer transition segment 80 being be disposed overlapping the magnetic element 56 beyond the magnet periphery 79 refers to the secondary coil outer transition segment 80 generally not being aligned with the magnetic element 56 when overlaid in a plane orthogonal to the axis of rotation 48 such as viewed in FIGS. 2 and 3.

While the magnetic element 56 may be formed of multiple magnets (such as the as the first and second magnets 66, 68), it is understood that the magnetic element 56 may be a single magnet with the first and second magnets 66, 68 being associated with poles of a magnet. The magnet element 56 maybe configured to be generally arced shaped and symmetrical. In addition to the magnetic element 56, the disk drive 10 may further include the magnetic element 58 coupled to the disk drive base 12. The main and secondary coils 52, 54 may be disposed between the magnetic elements 56, 58. The magnetic element 58 may be similarly configured as the magnetic element 56.

The first and second magnets 66, 68 have opposing magnetic field directions. Referring to the embodiment shown in FIGS. 2 and 3, the first magnet 66 has a magnetic field direction generally into the page and the second magnet 68 has a field direction generally out of the page. Such configuration is contemplated to interact with the secondary coil 54 and in particular to the overlapping lateral segment 74. Symbolic electromagnetic force lines are indicated associated with the different portions of the lateral segment 74 due to the interaction with the adjacent first and second magnets 66, 68. The force lines correspond to the secondary coil 54 having a current direction as indicated.

Referring now to FIG. 3, the coil 52 is shown in relation to the magnetic element 54 associated with the actuator 30 being in a nominal position. Such a nominal position may correspond to the actuator 30 being disposed such that the transducer heads 42, 44 are halfway between an inner diameter ("ID") data track adjacent the inner disk edge 22 and an outer diameter ("OD") data track adjacent the outer disk edge 20, with the ID and OD data tracks generally defining a recording surface of the disk 16.

As can be appreciated, as indicated in the corresponding force diagram of FIGS. 2 and 3, the sum of the electromagnetic forces of the secondary coil 54 is almost zero or at least of a non-substantial nature with respect to excitation of the butterfly mode of the actuator 30 in this nominal position. This is because that portion of the secondary coil 54 that produces electro-magnetic forces upon the actuator 30 is the lateral segment 74 which is disposed orthogonal to the axis of rotation 48. The remaining portion of the secondary coil 54 is the secondary coil transition segment 80 which is disposed beyond the magnet periphery 78, and is not contemplated to produce any significant electromagnetic forces with respect to the actuator 30. The resultant electromagnetic forces upon the actuator 30 are those which are in a direction generally parallel to the actuator longitudinal axis 64. Nonetheless, this arrangement produces a torque upon the actuator 30. Further, with the actuator 30 in other positions away from the nominal position, such as represented in FIG. 4, the sum of the electromagnetic forces applied to the actuator 30 along directions along the actuator longitudinal axis 76 would gradually increase from that at the nominal position. However, the sum of the electromagnetic forces applied to the actuator 30 along directions perpendicular to the actuator longitudinal axis 64 remain almost zero or at least of a non-substantial nature with respect to excitation of the butterfly mode of the actuator 30 throughout the range of motion of the actuator 30.

According to an embodiment, only a selected one of the main coil 52 and the secondary coil 54 is energizable at any given time. In this regard, the main coil 52 may be configured to be energized during track seeking operations, and the secondary coil 54 may be configured to be energized during track follow operations. Further, the main coil 54 may be configured to be not energized during track follow operations.

Referring now to FIG. 5, according to another embodiment, there is depicted a view similar to FIG. 2, however, with the actuator 30 having main and secondary coils 82, 84 substituted for main and secondary coils 52, 54. Further in this embodiment, a magnetic element 86 with first and second magnets 88, 90 are substituted for the magnetic element 56 and the first and second magnets 66, 68. FIG. 6 is an enlarged view of the magnetic element 86 and main and secondary coils 82, 84 of FIG. 5 (without an actuator body 32 shown) corresponding to the actuator 30 being angularly centered with respect to the magnetic element. FIG. 7 is a view similar to the magnetic element 86 and main and secondary coils 82, 84 of FIG. 6, however, with the main and secondary coils 82, 84 corresponding to the actuator 30 being in a rotated position.

As can be seen, in this embodiment, the secondary coil 84 is disposed outside of the main coil 82. In this regard, the main coil 82 may include a main coil outer transition segment 92 electrically connecting first and second radial segments 94, 96 of the main coil 82. The secondary coil 84 may be disposed radially further than the main coil outer transition segment 92 with respect to the axis of rotation 48. The magnetic element 86 may define a magnet periphery 98 and the main coil outer transition segment 92 may be disposed overlapping the magnetic element 86 within the magnet periphery 98. The main coil outer transition segment 92 may be arc-shaped and defined by a radius from the axis of rotation 48. In this regard, electro-magnetic forces associated with the interaction of the main coil outer transition segment 92 with the overlapping magnetic element 86 are radially aligned through the axis of rotation 48. The secondary coil 84 includes a lateral segment 100 which is disposed perpendicular to the actuator longitudinal axis 64. The lateral segment 100 is disposed overlapping with the magnet element 86. The lateral segment 100 may be disposed radially further than the main coil 82 with respect to the axis of rotation 48. In addition the secondary coil 84 may include a secondary coil outer transition segment 102 which is electrically connected to the lateral segment 100. The secondary coil outer transition segment 102 may be disposed overlapping with the magnetic element 86 beyond the magnet periphery 98.

Referring again to FIG. 14, according to another aspect of the invention, there is provided a method of operating the disk drive 10. The disk drive 10 includes the actuator 20 defining the actuator longitudinal axis 84 orthogonal to an axis of rotation 48. The disk drive 10 further includes the magnetic element 56 including the first and second magnets 66, 68 extending radially with respect to the axis of rotation 48. The method includes energizing the main coil 52 during track seek operations of the disk drive 10. The main coil 52 includes the first and second radial segments 70, 72. The first radial segment 70 overlaps the first magnet 66 throughout a full range of motion of the actuator. The second radial segment 72 overlaps the second magnet 68 throughout a full range of motion of the actuator 30. The method further includes energizing the secondary coil 54 during track follow operations of the disk drive 10. The secondary coil 54 is separately energized from the main coil 52. The secondary coil 54 is configured to produce magnetic forces upon the actuator 30 substantially parallel to the actuator longitudinal axis 64. The secondary coil 54 includes the lateral segment 74 disposed perpendicular to the actuator longitudinal axis 64 and overlapping the first and second magnets 66, 68 throughout the full range of motion of the actuator 30. The main coil 52 may be configured to be not energized during track follow operations.

I claim:

1. A disk drive comprising:
   a disk drive base;
   an actuator rotatably coupled to the disk drive base and defining an actuator longitudinal axis orthogonal to the axis of rotation, the actuator including an actuator body configured to pivot about an axis of rotation and a coil support extending from the actuator body;
   a magnetic element coupled to the disk drive base, the magnetic element including first and second magnets extending radially with respect to the axis of rotation;
   a main coil attached to the coil support, the main coil including first and second radial segments, the first radial segment overlapping the first magnet throughout a full range of motion of the actuator, the second radial segment overlapping the second magnet throughout the full range of motion of the actuator; and
   a secondary coil attached to the coil support, the secondary coil being separately energized from the main coil, the secondary coil being configured to produce magnetic forces upon the actuator substantially parallel to the actuator longitudinal axis, the secondary coil including a lateral segment disposed perpendicular to the actuator longitudinal axis and overlapping the first and second magnets throughout the full range of motion of the actuator.

2. The disk drive of claim 1 wherein the main coil includes a main coil outer transition segment electrically connecting the first and second radial segments, the magnetic element defines a magnet periphery, the main coil outer transition segment is disposed overlapping the magnetic element beyond the magnet periphery.

3. The disk drive of claim 2 wherein the secondary coil is disposed within the main coil.

4. The disk drive of claim 2 wherein the secondary coil includes a secondary coil outer transition segment electrically connected to the lateral segment, the secondary coil outer transition segment is disposed overlapping the magnetic element beyond the magnet periphery.

5. The disk drive of claim 1 wherein the main coil includes a main coil outer transition segment electrically connecting the first and second radial segments, the magnetic element defines a magnet periphery, the main coil outer transition segment is disposed overlapping the magnetic element within the magnet periphery.

6. The disk drive of claim 5 wherein the main coil outer transition segment is arc-shaped and is defined by a radius from the axis of rotation.

7. The disk drive of claim 5 wherein the lateral segment is disposed radially further than the main coil with respect to the axis of rotation.

8. The disk drive of claim 1 wherein only a selected one of the main coil and the secondary coil is energizable at any given time.

9. The disk drive of claim 1 wherein the main coil is configured to be energized during track seeking operations, the secondary coil is configured to be energized during track follow operations.

10. The disk drive of claim 9 wherein the main coil is configured to be not energized during track follow operations.

11. A method of operating a disk drive, the disk drive including an actuator defining an actuator longitudinal axis orthogonal to an axis of rotation, the disk drive further including a magnetic element including first and second magnets extending radially with respect to the axis of rotation, the method comprising:

a) energizing a main coil during track seek operations of the disk drive, the main coil including first and second radial segments, the first radial segment overlapping the first magnet throughout a full range of motion of the actuator, the second radial segment overlapping the second magnet throughout a full range of motion of the actuator; and b) energizing a secondary coil during track follow operations of the disk drive, the secondary coil being separately energized from the main coil, the secondary coil being configured to produce magnetic forces upon the actuator substantially parallel to the actuator longitudinal axis, the secondary coil including a lateral segment disposed perpendicular to the actuator longitudinal axis and overlapping the first and second magnets throughout the full range of motion of the actuator.

12. The method of claim 11 wherein the main coil is not energized during track follow operations.

* * * * *